Sept. 29, 1964 C. L. BOSSARD 3,151,321
DIGITAL ENCODER
Filed Dec. 28, 1960 2 Sheets-Sheet 1

INVENTOR.
CHARLES L. BOSSARD
BY [signature]
ATTORNEY

INVENTOR.
CHARLES L. BOSSARD
BY [signature]
ATTORNEY

United States Patent Office 3,151,321
Patented Sept. 29, 1964

3,151,321

DIGITAL ENCODER

Charles L. Bossard, Perkasie, Pa., assignor to the United States of America as represented by the Secretary of the Navy Filed Dec. 28, 1960, Ser. No. 79,085
2 Claims. (Cl. 340—347)
(Granted under Title 35, U.S. Code (1952), sec. 266)

The invention herein described may be manufactured and used by or for the Government of the United States of America for governmental purposes without the payment of any royalties thereon or therefor.

This invention relates to a position encoder and more particularly to a device for converting linear position of a body directly into a digital code.

Various systems for deriving a digital code from position information are commonly known in the prior art. One typical system utilizes a primary detector which converts position information into an analog voltage. This analog voltage must be converted to digital form by a separate analog-to-digital converter. Another typical system involves the use of a reference voltage and a voltage proportional to a position such as a shaft position. The two voltages are compared and a phase difference between the two voltages is indicative of position. However, such a system also requires some type of analog-to-digital converter to provide position information in digital form.

These systems are in general bulky, complex and require in every case some form of an analog-to-digital converter.

The present invention contemplates a linear position encoder which converts or changes the position of a shaft or the like directly into a digital code without any intermediate steps. The system of this invention eliminates the necessity for an analog-to-digital converter because the position information is converted directly into a digital form and not first to an analog form. The elimination of the analog-to-digital converter in this invention reduces the bulk and complexity present in the prior art systems.

Accordingly, it is an object of the present invention to provide a position encoder for a movable body such as a shaft or the like in which the position is converted directly into a continuous presentation of position information in digital code form which may be used to give position information directly or which may be directly inserted into a computer.

Another object of the present invention is to provide a position encoder which is less complex in construction and more reliable in operation than prior art systems and which is of a more rugged design.

Other objects and many of the attendant advantages of this invention will be readily appreciated as the same becomes better understood by reference to the following detailed description of one embodiment of the invention when considered in connection with the accompanying drawings wherein:

FIG. 1 schematically represents a plan view of a row of inductively wound magnetically permeable rods;

Figure 1:
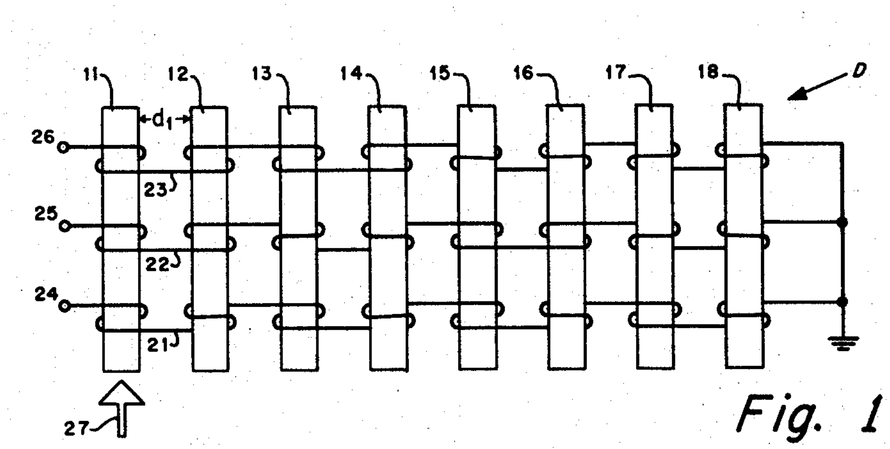

In the illustrated embodiment of the invention there is shown in FIG. 1 a row D of eight rods 11 through 18 of magnetically permeable material. The rods are all of equal length and lie in parallel relationship to one another. Each rod is separated from the next adjacent rod by a distance $d_1$. Each rod 11 through 18 has three continuous conductors 21, 22 and 23 inductively wound thereabout and which have output terminals 24, 25, and 26, respectively, at one end. The other end of each conductor is connected to a common point such as ground.

The manner in which each rod 11 through 18 is wound by each coil 21, 22, and 23 will now be discussed. The convention of a plus sign, +, will be used to describe a coil wound in a counterclockwise direction looking from bottom to top of the drawing in a direction parallel to the rods 11–18 and a minus sign, —, will be used to describe a coil wound in a clockwise direction looking in the same direction. This follows logically because as will be described more fully hereinafter, a coil on a rod wound in a clockwise direction will have a negative pulse induced therein, when the magnetic field on an armature is brought near the end of the (respective) rod, while a coil wound in a counterclockwise direction will have a positive pulse induced therein. The rods 11–18 are fixedly secured to maintain their relative position to one another as, for example, they may be embedded in an epoxy resin. The adjacent ends shown at the bottom of FIG. 1 of each rod 11–18 are exposed and define flat faces in a single plane. An arrow 27 is, for purposes of explanation, here intended to represent a concentrated magnetic field.

According to the convention adopted, the conductor 21 is wound around rods 11–18 in alternative minus and plus directions respectively. Conductor 22 is wound around each one of alternate pairs of the rods 11–18 in alternate minus and plus directions respectively. Conductor 23 is wound about each one of the rods 11–14 in a minus direction and around each one of rods 15–18 in a plus direction.

Figure 2:
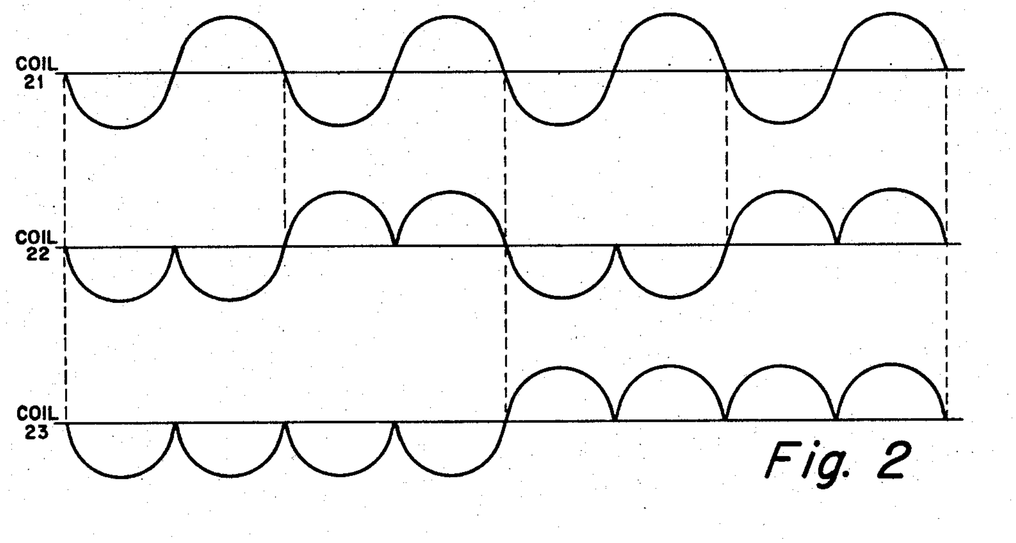
FIG. 2 is a graph to aid in explaining the discrete outputs for each rod.

The principle of operation of the encoder concept of this invention will now be discussed with the aid of FIGS. 1 and 2. As field 27 passes the rod 11, a discrete negative pulse is induced in each of the windings of conductors 21, 22, and 23 on rod 11 and appears at the output terminals 24, 25, and 26. Thus, when a negative pulse appears simultaneously at the outputs 24, 25, and 26, it is known that the field 27 is in a first position. When a positive pulse appears at the output terminal 24 and a negative pulse at each of the output terminals 25 and 26, it is known that the field 27 is in a second position opposite the rod 12. Each of the eight positions defined by the rods 11–18 has its own combination of pulses in the output terminals 24, 25, and 26. As can be seen from FIG. 2, the pulses induced in conductor 21 alternate positive and negative for each rod as it is passed by the field 27. The pulses induced in the conductor 22 are negative for the first two rods passed by the armature, positive for the second two rods passed, negative for the third two rods passed and positive for the fourth two rods passed. The pulses induced in the conductor 23 are negative for the first four rods passed by the armature and positive for the second four rods passed. Thus, for the condition of the field 27 passing the rods 11 through 18 the pulse outputs of the terminals 24, 25, and 26 are:

| Rod | Terminals | | |
|---|---|---|---|
| | 24 | 25 | 26 |
| 11 | — | — | — |
| 12 | + | — | — |
| 13 | — | + | — |
| 14 | + | + | — |
| 15 | — | — | + |
| 16 | + | — | + |
| 17 | — | + | + |
| 18 | + | + | + |

As can be seen from inspecting the above tabulation, the outputs from the terminals 24, 25, and 26 are, in effect, in binary code where a minus sign is equivalent to a "0" and a plus is equivalent to "1."

It should be clear from the foregoing that the number of rods and, therefore, the number of armature positions identifiable by a discrete series of pulses may be doubled merely by adding another conductor wound in a minus direction around each of the first eight rods and in a plus direction around each of the next eight rods. It will also be clear that the number of discrete sets of pulses per unit length of armature travel is limited only by the distance $d_1$ and the size of the rods.

Further, it may be seen that the pulses appearing on the output terminals 24, 25, and 26 aside from being used to tell position of a body are suitable for use in a binary type computer as an immediate and continuous source of input information to a computer.

Figure 4:
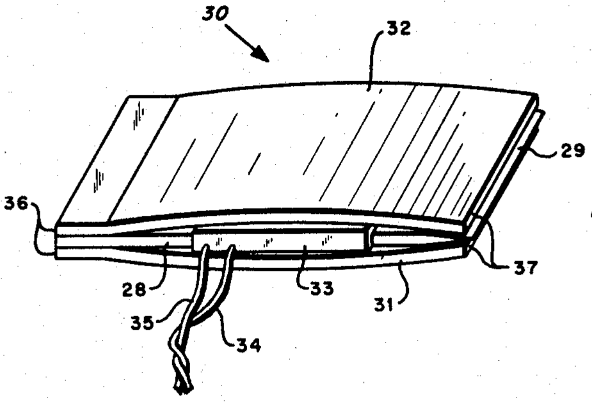
FIG. 4 is an isometric view of the armature used in FIG. 3.
Figure 3:
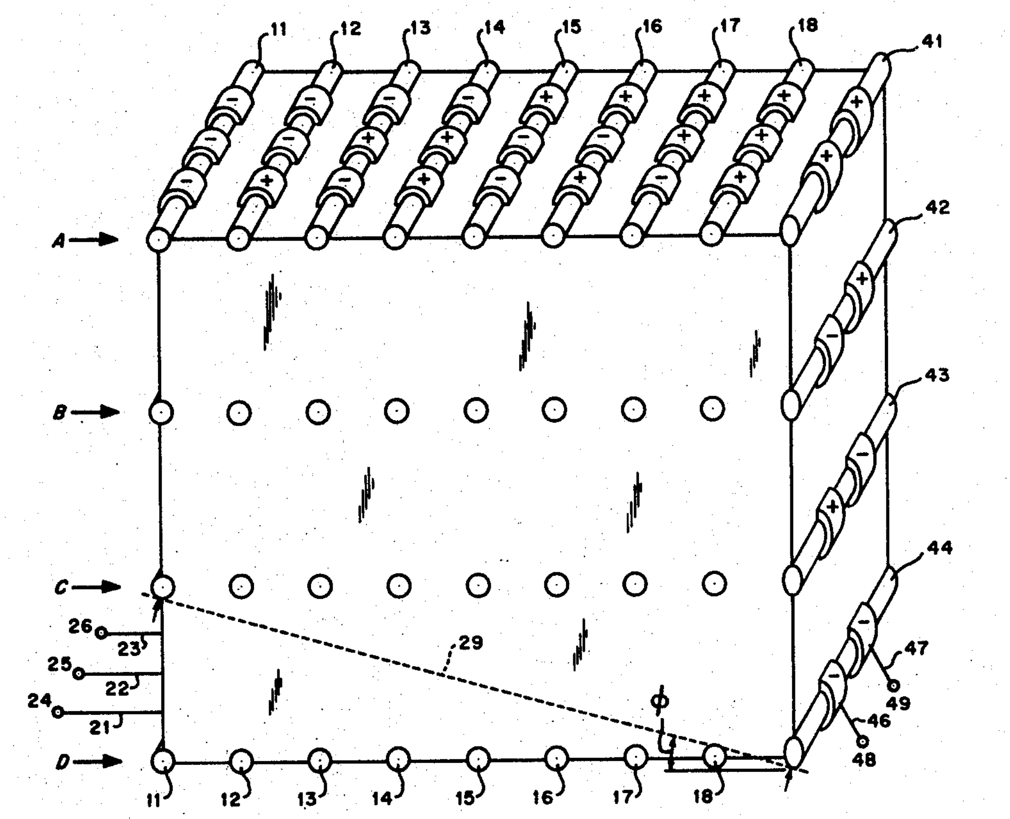
FIG. 3 represents an isometric view of a matrix of the rods of FIG. 1 showing the cooperative relationship of an armature therewith.

FIGS. 3 and 4 show an armature 30 and matrix of rods for use in the illustrated embodiment of this invention. FIG. 3 shows the armature 30 having a core 28 of magnetically permeable material terminating at one end into a knife edge 29. The core 28 is wound with a coil 33 having terminals 34 and 35 by which the coil 33 may be energized to produce a concentrated magnetic field about the knife edge 29. Flux guides 31 and 32 composed of a permeable material are mechanically and magnetically secured to the core 28 at their adjacent ends 36 in any convenient manner such as welding. The knife edge 29 of the core 28 protrudes slightly beyond the other of the adjacent ends 37 of the guides 31 and 32. There is an air gap between each of the ends 37 and the core 28 in the vicinity of the knife edge so that when the coil 33 is energized as by alternating current, a magnetic field will be produced about knife edge 29 and concentrated thereabout. The flux guides 31 and 32 serve to limit the area encompassed by the magnetic field and by virtue of their low reluctance return any excess field back through the core 28.

FIG. 4 shows four rows A, B, C and D of eight rods, such as rods 11–18, in a row. Each row A, B, C and D of rods is identical in form and operation to the row of rods 11–18 previously described. Furthermore, each rod in a particular row is wound by conductors 21, 22 and 23 in a manner identical to the way in which the conductors 21, 22 and 23 are wound on the rods 11–18 of FIG. 2. In other words, conductor 21 winds the rods 11–18 of the row D as described in FIG. 2 and repeats itself again in the rows C, B and A in a continuous fashion; the rod 11 of the rows D, C, B and A is wound by the conductor 21 in a minus direction; the rod 12 of each of the rows D, C, B and A is wound by the conductor 21 in a plus direction; the rod 13 in the rows D, C, B and A is wound by the conductor 21 in a minus direction; the conductor 21 winds each of the rods in the row D as described in FIG. 2, and continues on duplicating that winding in each of rows C, B and A. Likewise conductors 22 and 23 wind each of the rows D, C, B and A exactly as row D is wound, as described in connection with FIG. 2. Each of the rows A, B, C and D of FIG. 4 contains an extra rod 41 through 44, respectively, with each being wound by two separate conductors for the purpose of identifying rows as will hereinafter be explained more fully. Each of the rods in a row are equidistant from each other. Each of the rows are equidistant from each other. The rods are potted, as for example, by an epoxy resin. The ends of the rods of each of the rows terminate in a single plane with the potting material and form a flat planar surface with the ends of the rods themselves exposed.

A broken line 29 represents the knife edge of the armature 30 and has an angular position relative to the horizontal such that each rod in a row is swept separately and individually thereby. The angle $\phi$ with the horizontal is determined by making the knife edge 29 tangent to a plane touching the first rod of row B and rod 44 of row D in a manner best shown in the drawing.

The armature 30, which may be attached to any body whose linear position is to be coded, will sweep the planar face of the matrix at an angle $\phi$ with the horizontal. The distance between the knife edge 29 and the planar face of the matrix is determined only by the strength of the magnetic field created around the knife edge 29. In other words, the distance for a given magnetic field strength must be small enough to induce a voltage in the winding of each conductor on each rod as the knife edge 29 sweeps past each rod.

Conductors 46 and 47 are wound on the rod 44 in a minus direction such that when the knife edge 29 of the armature 30 passes the rod 44 two negative pulses appear on output terminals 48 and 49 of conductors 46, 47. The conductor 46 winds about the rod 43 in a plus direction, winds about the rod 42 in a minus direction and winds about the rod 41 in a plus direction. The conductor 47 winds about the rod 43 in a negative direction and winds about the rod 42 and 41 each in a positive direction. Thus, the outputs of the conductors 46 and 47 will always indicate which row the knife edge 29 of the armature 27 is sweeping.

In operation when the knife edge 29 begins to sweep the rod 11 of the row C, the rod 44 will begin to be swept. Therefore, the conductor 46 will have induced in it a negative pulse which appears on an output 48; and the conductor 47 also has a negative pulse induced in it which appears on an output 49. These two negative pulses indicate that the row C is being swept. The rods 41 through 44 preferably have an oval shape such that the knife edge 29 remains in the vicinity of each individual rod 41 through 44 while each individual row A, B, C or D is being swept by the knife edge 29. Thus, each individual row is distinguished from all others by a particular combination of plus and minus pulses, and each individual rod of each row is distinguished from each of the other rods in that row by a particular discrete combination of pulses at the output terminals 24, 25 and 26.

From the above description of this invention it may be seen that I have invented an uncomplicated position encoder having a matrix of magnetically permeable cores, separate conductors individually wound on individual cores and finally an armature with a concentrated magnetic field associated therewith and which is attached for movement by the body whose position is to be determined and encoded. Thus, as the armature moves along a path defined by the ends of the cores, a discrete series of pulses is induced in the conductors of each core. Thus, there is provided in digital form a continuous presentation of body position. Since the matrix assembly permits potting and the entire device has only one moving part, the invention is of a more rugged and durable construction.

Obviously, many modifications and variations of the present invention are possible in the light of the above teachings. It is therefore to be understood that within the scope of the appended claims the invention may be practiced otherwise than as specifically described.

What is claimed is:

1. An inductive digital encoder for transforming the linear position of a body directly into a digital code, comprising in combination: a plurality of equally spaced rows of magnetically permeable rods forming columns of equally spaced rods in parallel relationship to one another with adjacent ends of said rods defining a common planar face, a first plurality of continuous conductors, each of said plurality of conductors having an output terminal at one end and a common connection at the other end, each one of said first plurality of conductors being inductively wound on all of said rods in one of said rows, each one of said rods in said one row being uniquely wound by said first plurality of conductors in a combination of plus and minus directions different from the other of said rods in said one row, each of said rods in any one of said columns being identically wound by each of said first plurality of conductors, an additional rod in each of said rows forming an additional column, a second plurality of continuous conductors, each one of said second plurality of conductors being inductively wound on all of said rods in said additional column, each one of said rods in said additional column being uniquely wound by said second plurality of conductors in a combination of plus and minus directions different from the other of said rods in said additional column, each of said second plurality of conductors having an output terminal at one end and a common connection at the other end, an armature having an elongated knife edge adjacent said planar face including means for producing a concentrated magnetic field about said knife edge, means connecting said armature to said body for moving said armature in response to body movement, said knife edge forming a predetermined angle with said rows whereupon movement of said body causes said knife edge to sweep each of said rods, one rod at a time, in each of said rows whereby an individual series of pulses is induced in said first and second plurality of conductors and appears in said output terminals as each of said rods in each of said rows is passed by said magnetic field.

2. An inductive digital encoder for transforming the linear position of a body directly into a digital code comprising in combination: a plurality of rows of magnetically permeable rods forming columns of rods in parallel relationship to one another with adjacent ends of said rods defining a common planar face, a first plurality of continuous conductors, each of said plurality of conductors having an output terminal at one end and a common connection at the other end, each one of said first plurality of conductors being inductively wound on all of said rods in one of said rows, each one of said rods in said one row being uniquely wound by said first plurality of conductors in a combination of plus and minus directions different from the other of said rods in said one row, each of said rods in any one of said columns being identically wound by each of said first plurality of conductors, an additional rod in each of said rows forming an additional column, a second plurality of continuous conductors, each one of said second plurality of conductors being inductively wound on all of said rods in said additional column, each one of said rods in said additional column being uniquely wound by said second plurality of conductors in a combination of plus and minus directions different from the other of said rods in said additional column, each of said second plurality of conductors having an output terminal at one end and a common connection at the other end, an armature having an elongated knife edge adjacent said planar face including means for producing a concentrated magnetic field about said knife edge, means connecting said armature to said body for moving said armature in response to body movement, said knife edge forming a predetermined angle with said rows whereupon movement of said body causes said knife edge to sweep each of said rods, one rod at a time, in each of said rows whereby an individual series of pulses is induced in said first and second plurality of conductors and appears in said output terminals as each of said rods in each of said rows is passed by said magnetic field.

References Cited in the file of this patent

UNITED STATES PATENTS

| | | |
|---|---|---|
| 2,911,317 | Gabor | Nov. 3, 1959 |
| 2,931,023 | Quade | Mar. 29, 1960 |
| 3,083,353 | Bobeck | Mar. 6, 1963 |